Figure 1:
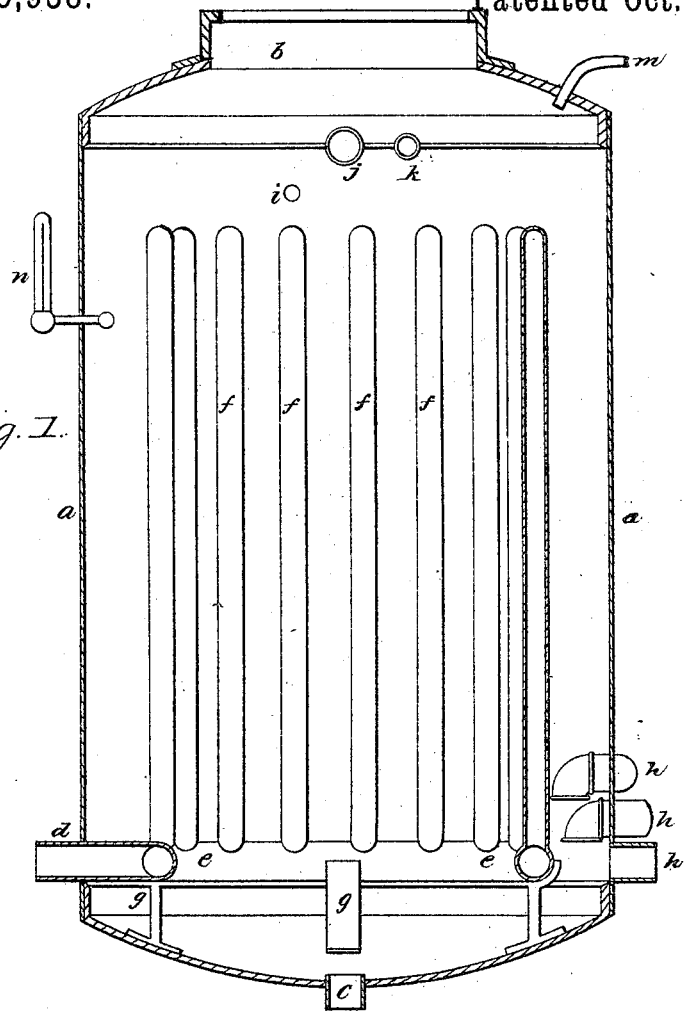

(No Model.)

H. A. WEBER & M. A. SCOVELL.
MACHINE FOR DEFECATING AND CLARIFYING THE JUICES OF SUGAR CANE, &c.

No. 285,938. Patented Oct. 2, 1883.

Witnesses:
W. C. Jindinston
Fred F. Church

Inventors:
Henry A. Weber
Melvill A. Scovell
by
Henry M. Beardsley
their Attorney

United States Patent Office.

HENRY A. WEBER, OF URBANA, ILLINOIS, AND MELVILL A. SCOVELL, OF STERLING, KANSAS.

MACHINE FOR DEFECATING AND CLARIFYING THE JUICES OF SUGAR-CANE, &c.

SPECIFICATION forming part of Letters Patent No. 285,938, dated October 2, 1883.

Application filed July 17, 1883. (No model.)

*To all whom it may concern:*

Be it known that we, HENRY A. WEBER and MELVILL A. SCOVELL, citizens of the United States, the former residing at Urbana, in the county of Champaign and State of Illinois, the latter at Sterling, county of Rice, and State of Kansas, have invented a new and useful Machine for the Defecating and Clarifying of the Juice of Sorghum-Cane, Sugar-Cane, and other Sugar-Producing Plants; and we do hereby declare that the following is a full, clear, and exact description of the invention, which will enable others skilled in mechanics to make and use the same.

Heretofore, in the defecating of the juices of the sorghum-cane, sugar-cane, or other sugar-producing plants by the ordinary method in open pans, the processes used have worked but imperfect results. Even when the defecation is most carefully carried on the impurities are but partially removed from the juice, and in the evaporators, and at subsequent stages of the sugar-making process, a scum is constantly arising or impurities are separating out. This causes evaporation to go on less rapidly, causes a loss of sugar by means of the constant skimming, and leaves much matter in the bone-black when that is used, thus making it necessary to char it more often, and increasing the expense of sugar-making, or, when bone-black is not used, leaving the impurities in the sugar or sirup. We have determined by investigation that, if the sugar-producing juice be first superheated in a closed vessel, nearly all these impurities are at once removed, owing chiefly to the fact that a large portion of the foreign matter in the juice requires a higher temperature for its coagulation than that at which the juice boils in open pans. The apparatus which we have invented removes nearly all these foreign matters at once. It has, too, this further advantage, that impurities held in suspension are carried down in the defecator with the settling coagulated matter, and there is also a great saving of time and labor.

Our apparatus consists of a shell fitted with various pipes for the admission and exit of juice, water, steam and air, as will be hereinafter described, and more readily understood by reference to the accompanying drawings.

The size and shape of the defecator may be varied, as also the arrangement of the various parts; but the apparatus of the shape and dimensions hereinafter described has been found by us best adapted to the use to which it is to be applied. The defecator is a cylindrical shell of iron or copper eight feet high and four feet in diameter.

Figure 2:
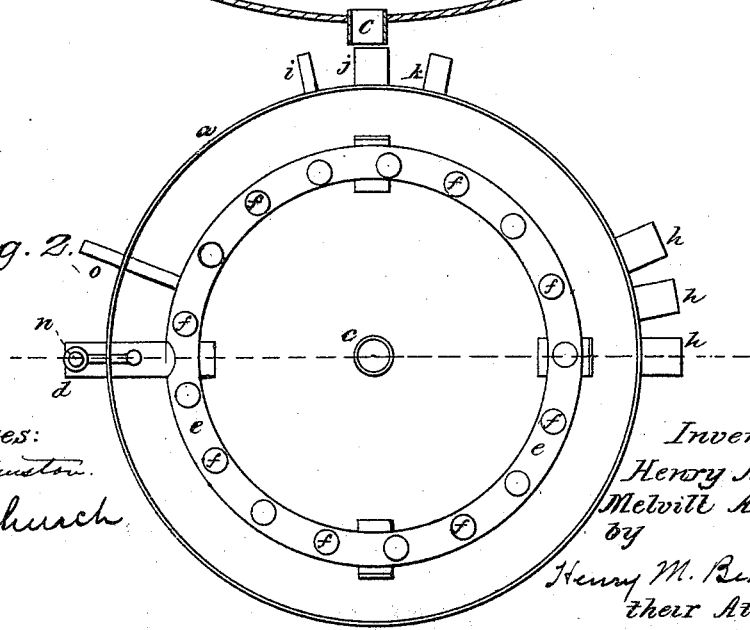

Figure 1 is a vertical section cut through on the diameter shown by the dotted line in Fig. 2. Fig. 2 is a horizontal section, showing the defecator as seen from above.

Similar letters refer to similar parts.

$b$ is a man-hole, made elliptical in form, and about ten by fifteen inches.

$f f f f$ are copper pipes two inches in diameter and thirteen in number, through which the steam passes for the purpose of heating the juice. These pipes are fitted into a large copper pipe, $e e$, three (3) inches in diameter, into which the steam enters by the inlet $d$. These pipes may be made of iron or other metal; but copper is best for this purpose.

$o$ is the steam-outlet.

$h h h$ are draw-off pipes, located at different heights, as shown in Fig. 1.

$j$ is the juice-inlet, and $k$ a water-inlet.

$i$ is a stop-cock, used to show when the defecator is full of liquor, and is kept open for the escape of air during the time that the defecator is being filled with juice.

$n$ is a thermometer.

$m$ is an inlet for steam or air.

We make the bottom of the defecator conical, as is shown in Fig. 1.

$c$ is the exit for the sediment.

Instead of the vertical pipes $f f f f$, with their base $e e$, we sometimes use a spiral coil, making the steam-inlet at or near the top of the defecator and the outlet at or near the bottom.

The method of using this apparatus is as follows: The defecator is filled to $i$ with juice which has been first properly neutralized through the inlet $j$, and steam turned on until the thermometer indicates that it has been sufficiently heated. The temperature desired is about two hundred and thirty degrees (230°) Fahrenheit. The pressure upon the surface of the liquid by the cushion of air above it prevents ebullition, and the foreign matter, coagulated by the heat, settles to the bottom, carrying with it any feculent matter held in suspension. After the steam has been turned off and time given the sediment to subside, the juice is drawn off at the outlets h h h, using one or all of these above the line of the sediment. During the time the clear juice is being drawn off, steam or air is let in (or forced in) by the opening m, thus keeping a constant pressure upon the surface of the liquor, preventing ebullition and a stirring up of the sediment. The sediment is finally drawn off at C.

Fig. 1 shows the tubes h h h curved down within the shell. If the juice, while still heated above the boiling-point, were drawn off through a straight pipe, put at right angles into the shell, while the pressure of steam or air entering through the opening m was continuing upon the surface of the descending liquor, so soon as the surface of the liquor reached the upper point of the opening of the exit the steam would escape, the pressure upon the juice be removed, and the sediment would be stirred up. With the curved pipe, the liquor can be drawn off to the level of the bottom of the exit used before any steam can escape.

Besides the advantages before described, it will be readily seen that our defecator has this further advantage, that the clear juice may be drawn off while still at the boiling-point, and thus a great deal of heat, usually required to commence evaporation, may be saved.

Having thus completely described our invention, what we desire to claim and secure by Letters Patent is—

A closed defecator consisting of a cylinder, a a, of copper or iron, having a conical bottom, a man-hole, b, a thermometer, n, an opening, j, for the admission of juice, an opening, k, for the admission of water, an opening, i, for the exit of air, exit-tubes h h h, for the exit of the clarified juice, with internal steam-heating pipe or coil, and having an entrance-pipe, d, and an exit, o, also an opening, c, for the removing of sediment, and an opening, m, for the admission of steam or air.

HENRY A. WEBER.
MELVILL A. SCOVELL.

Witnesses:
WILL J. BARTHOLF,
PHILLIP E. LAURENCE.